United States Patent [19]
Ando et al.

[11] Patent Number: 6,105,611
[45] Date of Patent: Aug. 22, 2000

[54] RESERVOIR TANK

[75] Inventors: Masamoto Ando, Toyota; Takashi Nagashima, Aichi-ken; Mitsuharu Hayashi, Nishio; Hirohisa Kuwana, Toyota, all of Japan

[73] Assignee: Aisin Seiki Kabushiki Kaisha, Kariya, Japan

[21] Appl. No.: 09/107,469

[22] Filed: Jun. 30, 1998

[51] Int. Cl.[7] .............................. G01F 23/30; F17D 3/00; E03B 7/07
[52] U.S. Cl. .............................. 137/558; 137/574; 73/308
[58] Field of Search .................................. 137/558, 574; 73/308, 306

[56] References Cited

U.S. PATENT DOCUMENTS

| | | | |
|---|---|---|---|
| 1,150,122 | 8/1915 | Tsavons | 137/558 |
| 3,173,469 | 3/1965 | Shockey | 137/574 |
| 3,989,056 | 11/1976 | Reinartz | 73/307 |

FOREIGN PATENT DOCUMENTS

| | | | |
|---|---|---|---|
| 3-27017 | 6/1991 | Japan . | |
| 973474 | 10/1910 | United Kingdom | 137/558 |

Primary Examiner—Henry Bennett
Assistant Examiner—Ken Rinehart
Attorney, Agent, or Firm—Burns, Doane, Swecker & Mathis, LLP

[57] ABSTRACT

A reservoir tank includes a main portion and a storage chamber disposed in the main portion for storing operating fluid, with the storage chamber being surrounded by a side wall, a ceiling portion and a bottom portion. A float is disposed in the storage chamber and is adapted to move vertically corresponding to the height of the operating fluid level, and a reed switch is operatively associated with the float so as to operate in accordance with the height of the float. A partition member divides the storage chamber into an upper space and a lower space in which the operating fluid and the float are disposed.

10 Claims, 3 Drawing Sheets

RESERVOIR TANK

FIELD OF THE INVENTION

The present invention generally relates to a reservoir tank for storing operating fluid. More particularly, the present invention pertains to a reservoir tank for storing a predetermined quantity of operating fluid used for operating hydraulic equipment installed on a vehicle.

BACKGROUND OF THE INVENTION

A conventional reservoir tank used in a vehicle includes a main portion mounted on a vehicle, a storage chamber disposed on the main portion for storing operating fluid, a vertically movable float disposed in the storage chamber and a switch device which is operated by the vertical movement of the float. The storage chamber is surrounded by side walls, a ceiling portion and a bottom portion.

In this conventional reservoir tank, when a predetermined quantity of operating fluid is stored in the storage chamber, the float is positioned at a position corresponding to the OFF position of the switch device. As the quantity of operating fluid in the storage chamber is reduced, the level of the fluid falls and the float descends. When the level of the operating fluid falls to a level causing the float to descend to a position corresponding to the ON level of the switch device, the switch device changes from the OFF position to the ON position, thereby causing an idiot light in the vehicle, for example, to be turned on.

With the conventional reservoir tank installed on a vehicle, when the brake is operated while the vehicle is traveling, the level of the operating fluid inclines as the operating fluid moves to one side of the reservoir tank because of the inertia force. When the operating fluid level is inclined to a rather significant extent because of the shifting of the operating fluid, the float may have a tendency to move downward to the ON position of the switch device. When the float moves downward to the ON position of the switch device, the switch device will change to the ON position and cause activation of the idiot light, even though there is a sufficient quantity of operating fluid in the reservoir tank. Thus, this conventional reservoir tank is liable in some instances to provide an inaccurate indication of the quantity or level of operating fluid.

In light of the foregoing, a need exists for a reservoir tank which provides a more accurate indication of the level or quantity of operating fluid within the reservoir tank in certain operating conditions of the vehicle.

A need also exists for a reservoir tank which is not as susceptible to variations in the operating conditions of the vehicle for purposes of providing an indication of the quantity of operating fluid in the reservoir tank.

SUMMARY OF THE PRESENT INVENTION

In light of the foregoing, one aspect of the present invention involves a reservoir tank that includes a main portion and a storage chamber disposed in the main portion for storing operating fluid. The storage chamber is surrounded by a side wall, a ceiling portion and a bottom portion. A float is disposed in the storage chamber and is adapted to move vertically corresponding to the height of the operating fluid level, and a reed switch is operatively associated with the float so as to operate in accordance with the height of the float. A partition member divides the storage chamber into an upper space and a lower space in which the operating fluid and the float are disposed.

According to another aspect of the invention, a reservoir tank includes a main portion, and a storage chamber disposed in the main portion for storing operating fluid, with the storage chamber being surrounded by a side wall, an upper portion and a bottom portion. A vertically movable float is disposed in the storage chamber for moving based on the level of the operating fluid in the storage chamber. A switch is operatively associated with the float for indicating when the float has descended below a predetermined level to indicate that a low quantity of operating fluid exists in the storage chamber. In addition, the reservoir tank is provided with an arrangement for preventing the float from descending below the predetermined level due to an inclination of the operating fluid in the storage chamber and regardless of the amount of inclination of the operating fluid in storage chamber.

A further aspect of the present invention involves a reservoir tank that includes a main portion and a storage chamber disposed in the main portion for storing operating fluid. The storage chamber is surrounded by a side wall, a ceiling portion and a bottom portion and includes a first lower space and a second lower space, with the second lower space being disposed below the first lower space. The first lower space and the second lower space each possess a horizontal cross-sectional area, with the horizontal cross-sectional area of the first lower space being smaller than the horizontal cross-sectional area of the second lower space. A vertically movable float is positioned in the storage chamber, and the float is movable through the first lower space and the second lower space. A switch device is operatively associated with the float for being operated based on the position of the float.

BRIEF DESCRIPTION OF THE DRAWING FIGURES

The foregoing and additional features and characteristics associated with the present invention will become more apparent from the following detailed description considered with reference to the accompanying drawing figures in which like elements are designated by like reference numerals and wherein.

DETAILED DESCRIPTION OF THE INVENTION

Figure 1:
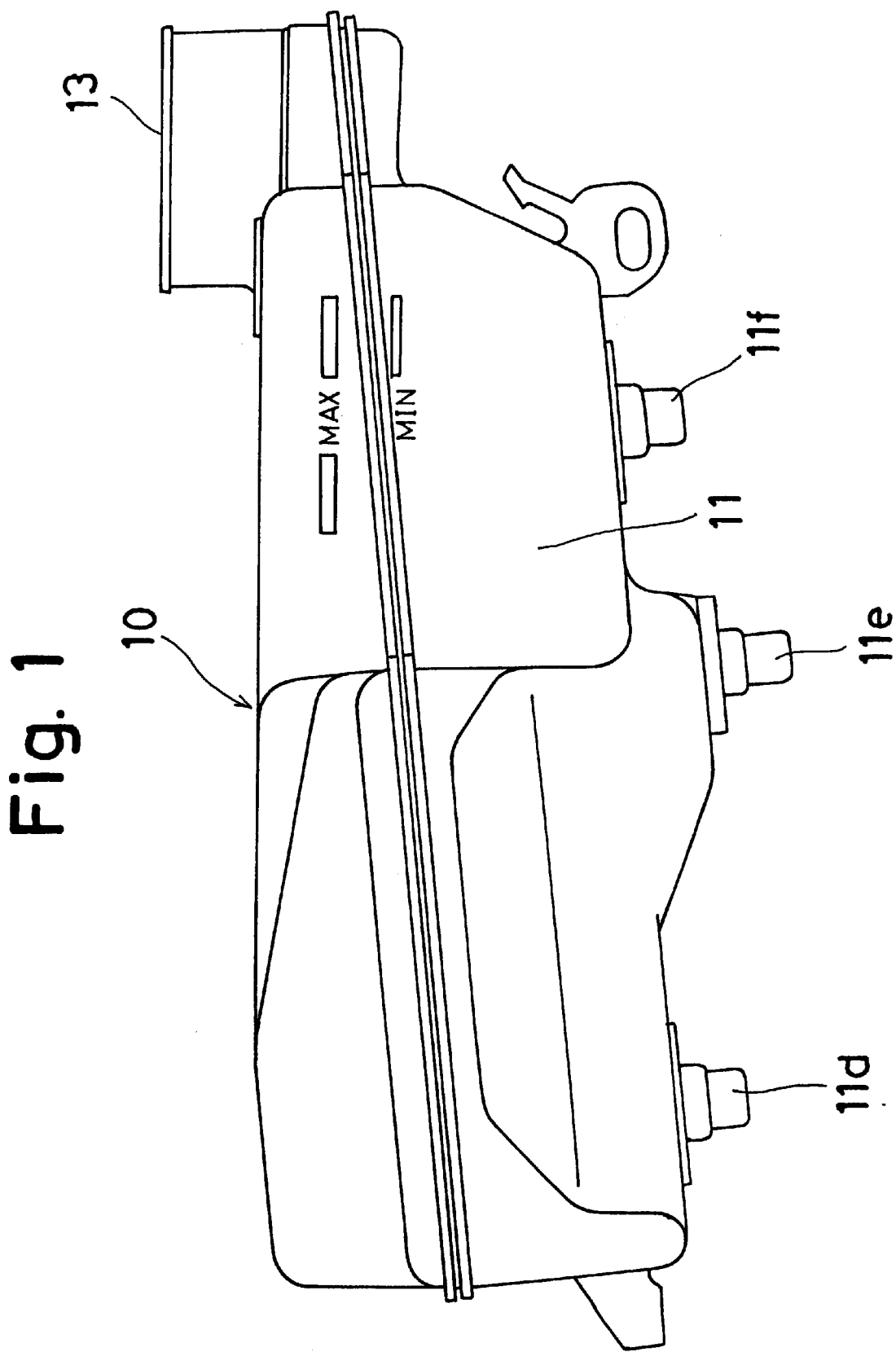
FIG. 1 is a side view of the reservoir tank of the present invention.

FIG. 1 illustrates a reservoir tank 10 that is adapted to be mounted on the upper portion of a hydraulic brake booster in a vehicle. The reservoir tank 10 includes a main reservoir portion 11 in which is disposed a storage area or chamber 12 and a fluid pour opening 13 which is disposed at the upper portion of the front side (i.e., the upper right hand side of FIGS. 1–3) of the main reservoir portion 11 for pouring brake fluid into the reservoir tank.

The storage area 12 is surrounded by and enclosed within a ceiling or upper portion 11a, a side wall 11b and a bottom portion 11c. Further, the storage area 12 is divided into a first storage chamber 12a, a second storage chamber 12b, a third storage chamber 12c, a fourth storage chamber 12d and a fifth storage chamber 12e by partition walls 19a, 19b, 19c, 19d. The storage chambers 12a, 12b, 12c, 12d, 12e are connected to each other through connecting openings disposed on the partition walls 19a, 19b, 19c, 19d. Further, the storage chambers 12 are adapted to be connected to the hydraulic brake booster through fluid supply passages 11d, 11e, 11f that are disposed on the bottom portion 11c of the main reservoir portion 11.

Figure 2:
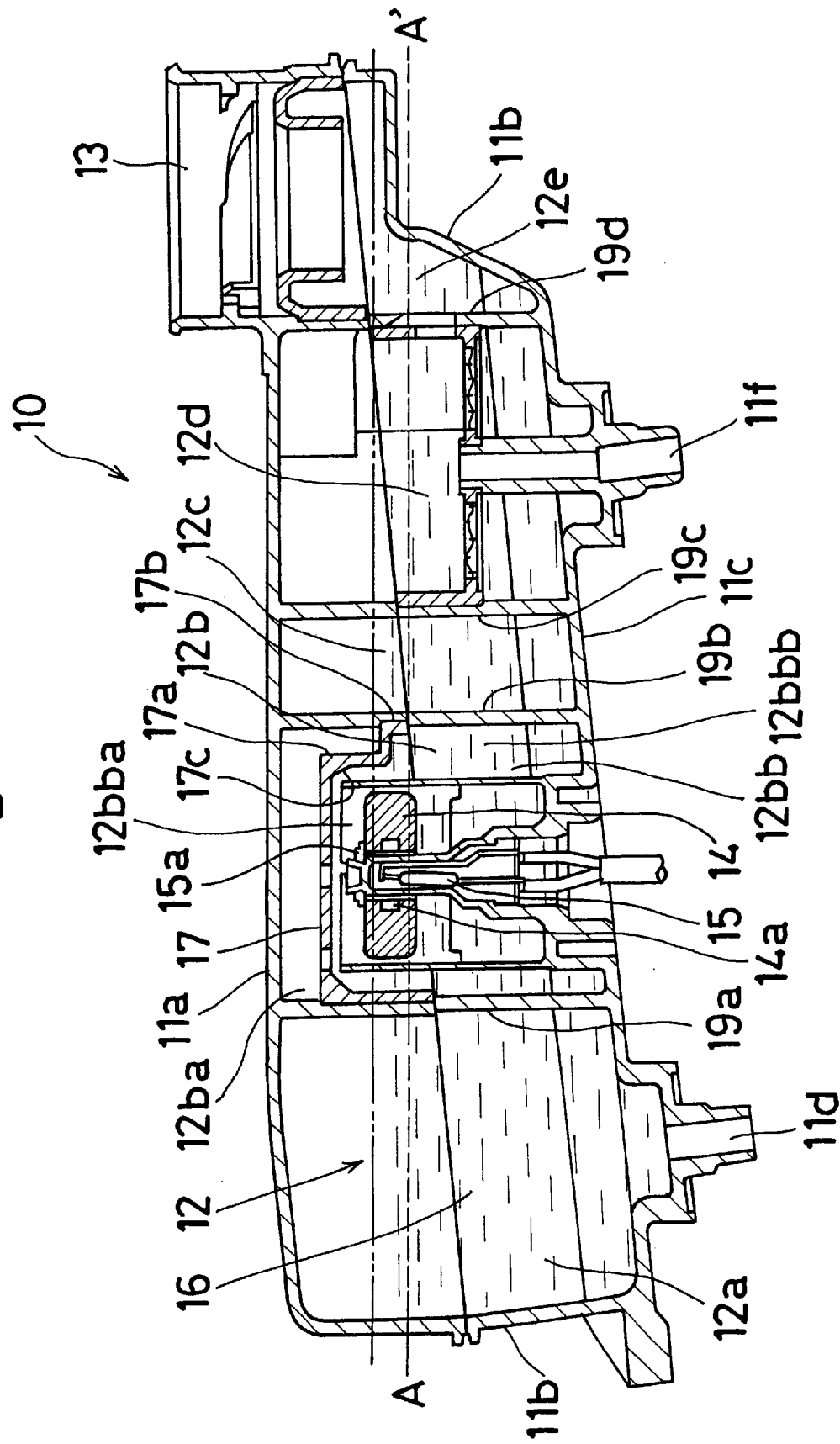
FIG. 2 is a cross-sectional view of the reservoir tank shown in FIG. 1.

As seen in FIG. 2, a float 14 and a reed switch 15 are disposed in the second storage chamber 12b. The reed switch 15 is positioned centrally within the second storage chamber 12b and possesses a pillar shaped configuration that extends upwardly from the bottom portion 11c. The float 14 possesses a circularly shaped configuration having a through hole into which the reed switch 15 extends. The float 14 is vertically movable relative to the reed switch 15 within the second storage chamber 12b.

A retainer 15a is mounted on the upper end of the reed switch 15 for preventing the float 14 from being raised above the upper end of reed switch 15 and falling off the reed switch 15. The retainer 15a thus restricts the vertical movement of the float 14.

A permanent magnet 14a possessing a ring-shaped configuration is disposed in the float 14. When the permanent magnet 14a is positioned below a predetermined position (the broken line A–A' shown in FIG. 2), the reed switch 15 is changed to the ON position. A further detailed description of the float 14 and the reed switch 15 will be not be set forth because the float 14 and the reed switch 15 are known.

A cap 17 that functions as a partition member is disposed in the upper portion or half of the second storage chamber 12b. The cap 17 extends across the entire second storage chamber 12b and divides the second storage chamber 12b into an upper space 12ba and a lower space 12bb. The upper space 12ba is surrounded by and enclosed within the ceiling portion 11a of the main reservoir portion 11, the partition walls 19a, 19b, and the upper surface of the cap 17. The lower space 12bb is surrounded by end enclosed within the partition walls 19a, 19b, the bottom portion 11c of the main reservoir portion 11 and the lower surface of the cap 17. As shown in FIG. 2, the float 14 and the reed switch 15 are disposed in the lower space 12bb, that is they are positioned below the cap 17.

The cap 17 is formed with an upper portion 17a and a lower portion 17b. The cross-sectional area of the upper portion 17a of the cap 17 in the horizontal direction (i.e., along a horizontal line extending in the right and left directions in FIG. 2) is smaller than the cross-sectional area of the lower portion 17b of the cap 17 in the horizontal direction. By virtue of the cap 17, the lower space 12bb of the second storage chamber 12b includes a first lower space 12bba and a second lower space 12bbb, with the second lower space 12bbb being disposed below the first lower space 12bba. The first lower space 12bba is surrounded by the upper portion 17a of the cap 17, and the second lower space 12bbb is surrounded by the lower portion 17b of the cap 17 and the partition walls 19a, 19b. Also, the float 14 is movable in the lower space 12bb from the first lower space 12bba to the second lower space 12bbb.

The cross-sectional area of the first lower space 12bba in the horizontal direction (i.e., along a horizontal line extending in the right and left directions in FIG. 2) is smaller than the cross-sectional area of the second lower space 12bbb in the horizontal direction (i.e., along a horizontal line extending in the right and left directions in FIG. 2). Further, the upper portion 17a of the cap 17 includes an angled interior corner portion 17c. This angled interior corner portion 17c is located at the intersection of the horizontally extending upper wall of the upper portion 17a of the cap and the adjacent vertically extending side wall of the upper portion 17a. Therefore, the volume of the first lower space 12bba is limited or reduced in a way that restrains the float 14 from moving downwardly when the brake fluid level in the reservoir tank 10 is inclined.

In the storage chamber 12, a predetermined quantity of brake fluid 16 is stored. As shown in FIG. 2, the level of the brake fluid 16 is normally positioned at the position indicated by the two-dotted line.

When the predetermined quantity of brake fluid 16 is stored in the storage chamber 12, the float 14 is positioned at the upper end of the reed switch 15 and is in contact with the retainer 15a. At this position of the float 14, because the permanent magnet 14a is located above the switching position of the reed switch 15 (the broken line shown in FIG. 2), the reed switch 15 is not changed to the ON position and so the idiot light in the vehicle which is designed to provide a warning concerning the lack of brake fluid 16 in the reservoir tank 10 is not turned on.

The brake fluid level in the storage chamber 12 descends as the amount of brake fluid 16 decreases. When, the brake fluid level descends to a level that causes the permanent magnet 14a of the float 14 to be located at the broken line shown in FIG. 2, the reed switch 15 is changed to the ON position to turn on the idiot light in the vehicle.

Figure 3:
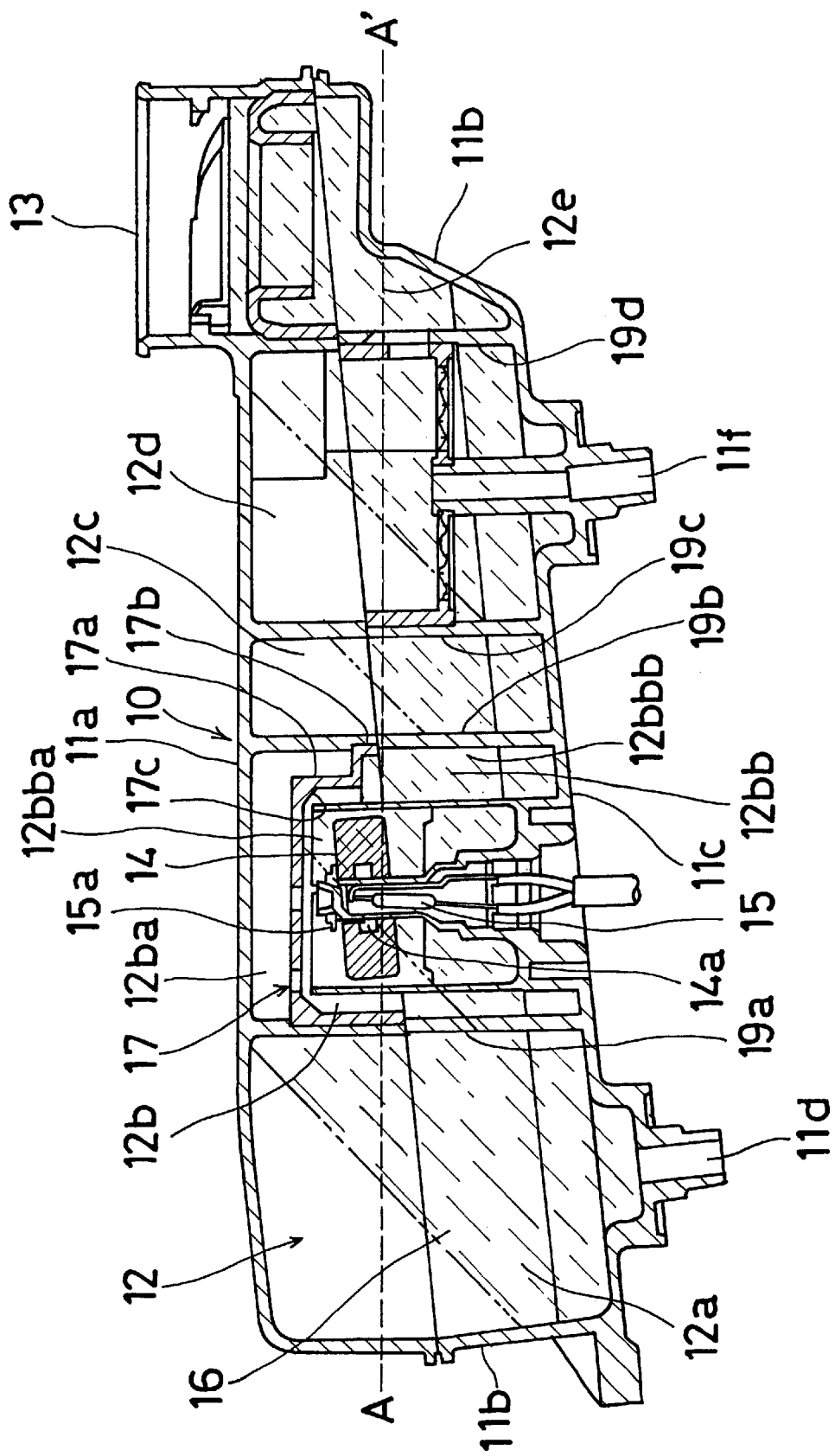
FIG. 3 is a cross-sectional view of the reservoir tank shown in FIG. 1 when the operating fluid level is inclined.

FIG. 3 illustrates the brake fluid level in the reservoir tank 10 in an inclined state. As shown in FIG. 3, when the brake is operated while the vehicle is moving, for example, the brake fluid 16 in the reservoir tank 10 shifts towards the forward direction, that is the brake fluid 16 shifts or leans to the front side (i.e., the right side in FIG. 3) of the reservoir tank 10 because of the inertia force.

When the brake fluid 16 shifts or leans to the front side of the reservoir tank 10, the brake fluid levels in the storage chambers 12a, 12b, 12c, 12d, 12e become inclined so that the brake fluid levels rise in the forward direction of the reservoir tank 10 as illustrated by the two-dotted line in FIG. 3. That is, the brake fluid levels rise in the front part of each of the storage chambers of the reservoir tank 10.

According to the conventional reservoir tank, the reed switch 15 is disposed at the rear portion in the second storage chamber 12b relative to the center portion of the second storage chamber 12b. Therefore, when the brake fluid level is inclined, the height of the brake fluid level located at the center portion of the reed switch 15 is lower than that of the brake fluid level located at the center portion of the reed switch 15 under the normal condition (shown in FIG. 2).

On the other hand, in accordance with the present invention, because the cap 17 is disposed in the second storage chamber 12b, the cap 17 prevents the brake fluid 16 from flowing into the upper space 12ba when the brake fluid level is inclined. Therefore, when the brake fluid level is inclined such as in the manner shown in FIG. 3, the height of the brake fluid level located at the center portion of the reed switch 15 is higher than or equal to that of the brake fluid level located at the center portion of the reed switch 15 under the normal condition shown in FIG. 2. Consequently, although the brake fluid level is inclined, the float 14 does not move downward and so the reed switch 15 is not changed to the ON position. Consequently, the idiot light in the vehicle is not turned on and so there is no inaccurate indication of a low fluid level in the reservoir 11. Thus, by virtue of the present invention, when the fluid in the reservoir is inclined, the float 14 is maintained at a level above the level at which the reed switch is changed to the ON position, regardless of the amount or degree of inclination of the fluid. Thus an inaccurate or false indication of a low fluid level in the reservoir does not occur. At the same time, the operation of the float 14 is not affected and so when the quantity of fluid in the second storage chamber 12b is reduced to an extent that causes the permanent magnet 14a to fall below the predetermined position level, the reed switch 15 is changed to the ON state.

In accordance with the embodiment of the present invention described above, because a corner portion 17c is disposed on the upper portion 17a of the cap 17 to reduce the volume of the first lower space 12bba, when the brake fluid level is inclined such as in the manner shown in FIG. 3, the height of the brake fluid level located at the center portion of the reed switch 15 can be efficiently higher than that of the brake fluid level located at the center portion of the reed switch 15 under the normal condition shown in FIG. 2. Therefore, even under conditions which cause a severe inclination of the brake fluid in the reservoir tank 10, the float 14 does not move downward and provide a false indication of a low fluid level in the reservoir.

As described above, brake operation while the vehicle is moving is described as the vehicle condition which results in inclination of the brake fluid level in the reservoir tank. However, the vehicle condition resulting in inclination of the fluid level in the reservoir tank is not limited to brake operation while the vehicle is traveling. For example, the turning motion of the vehicle can also generate the inclination of the brake fluid level in the reservoir tank.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A reservoir tank comprising:
    a main portion;
    a storage chamber disposed in the main portion for storing operating fluid, said storage chamber being surrounded by a side wall, a ceiling portion and a bottom portion and including a first lower space and a second lower space, the second lower space being disposed below the first lower space, the first lower space and the second lower space each possessing a horizontal cross-sectional area, with the horizontal cross-sectional area of the first lower space being smaller than the horizontal cross-sectional area of the second lower space, and including a partition member disposed in the storage chamber and separating the first lower space from an upper space disposed in the storage chamber above the first lower space, the partition member possessing a cap-shaped configuration having an angled interior corner portion;
    a vertically movable float disposed in the storage chamber, said float being movable through the first space and the second space; and
    switch means operatively associated with the float for being operated based on a position of the float.

2. A reservoir tank as recited in claim 1, wherein the storage chamber is one of a plurality of storage chambers in the main portion.

3. A reservoir tank comprising:
    a main portion;
    a storage chamber disposed in the main portion for storing operating fluid, said storage chamber being surrounded by a side wall, a ceiling portion and a bottom portion and including a first lower space and a second lower space, the second lower space being disposed below the first lower space, the first lower space and the second lower space each possessing a horizontal cross-sectional area, with the horizontal cross-sectional area of the first lower space being smaller than the horizontal cross-sectional area of the second lower space, and including a partition member disposed in the storage chamber and separating the first lower space from an upper space disposed in the storage chamber above the first lower space, the partition member extending across the entire storage chamber;
    a vertically movable float disposed in the storage chamber, said float being movable through the first space and the second space; and
    switch means operatively associated with the float for being operated based on a position of the float.

4. A reservoir tank as recited in claim 3, wherein the partition member possesses a cap-shaped configuration having an angled interior corner portion.

5. A reservoir tank as recited in claim 3, wherein the storage chamber is one of a plurality of storage chambers in the main portion.

6. A reservoir tank comprising:
    a main portion;
    a storage chamber disposed in the main portion for storing operating fluid, said storage chamber being surrounded by a side wall, a ceiling portion and a bottom portion and including a first space and a second space, the second space being disposed below the first space, the first space and the second space each possessing a horizontal cross-sectional area, with the horizontal cross-sectional area of the first space being smaller than the horizontal cross-sectional area of the second space;
    a vertically movable float disposed in the storage chamber, said float being movable through the first space and the second space; and
    switch means operatively associated with the float for being operated based on a position of the float, the switch means being centrally located in the first and second spaces.

7. A reservoir tank as recited in claim 6, wherein the first space is a first lower space and the second space is a second lower space, and including a partition member disposed in the storage chamber that separates the first lower space from an upper space disposed in the storage chamber above the first lower space.

8. A reservoir tank as recited in claim 6, wherein the storage chamber is one of a plurality of storage chambers in the main portion.

9. A reservoir tank as recited in claim 6, wherein the partition member possesses a cap-shaped configuration having an angled interior corner portion.

10. A reservoir tank as recited in claim 6, wherein the partition member extends across the entire storage chamber.

* * * * *

UNITED STATES PATENT AND TRADEMARK OFFICE
CERTIFICATE OF CORRECTION

PATENT NO.    : 6,105,611
DATED         : August 22, 2000
INVENTOR(S)   : M. Ando, et al.

It is certified that error appears in the above-identified patent and that said Letters Patent is hereby corrected as shown below:

The following information is added:
[30]          Foreign Application Priority Data
    June 30, 1997          [JP] Japan............... 9-174184

Signed and Sealed this

Ninth Day of October, 2001

Attest:

NICHOLAS P. GODICI
Attesting Officer        *Acting Director of the United States Patent and Trademark Office*